W. H. COURTENAY.
AUTO TREAD.
APPLICATION FILED FEB. 16, 1916.
1,260,651.
Patented Mar. 26, 1918.
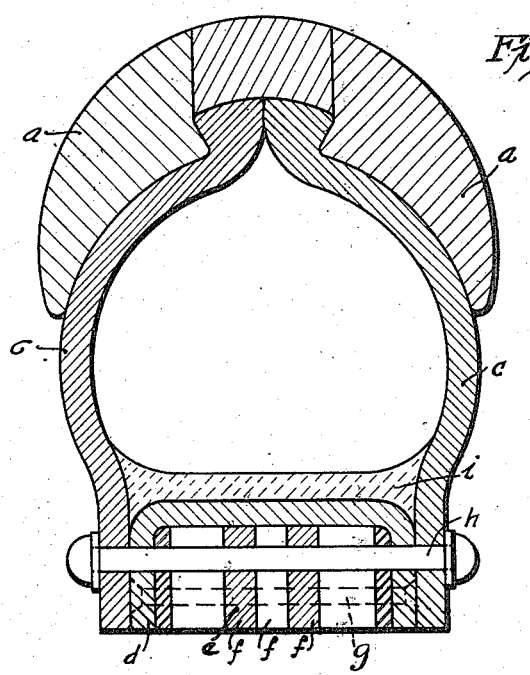
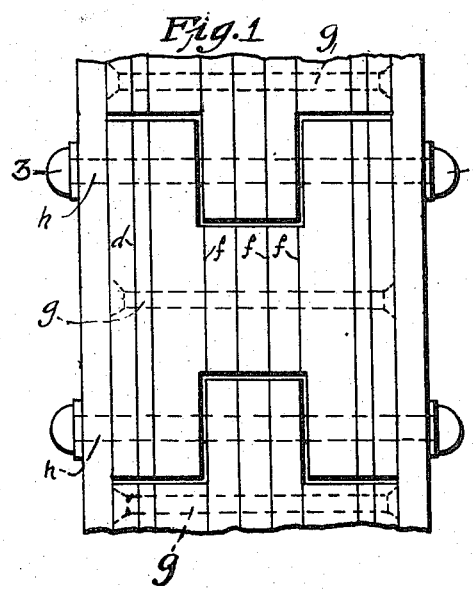
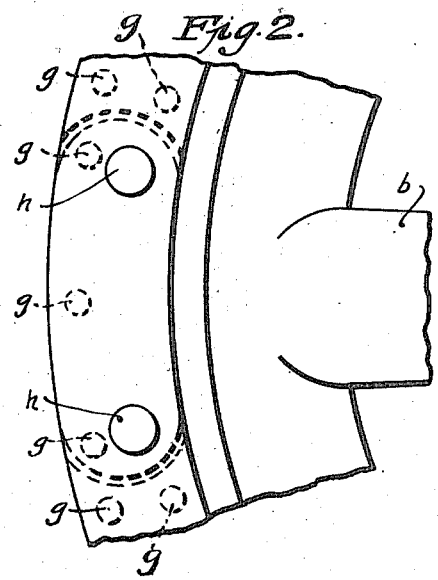
Inventor
WM. H. COURTENAY

UNITED STATES PATENT OFFICE.

WILLIAM H. COURTENAY, OF PHILADELPHIA, PENNSYLVANIA.

AUTO-TREAD.

1,260,651. Specification of Letters Patent. Patented Mar. 26, 1918.

Application filed February 16, 1916. Serial No. 78,627.

*To all whom it may concern:*

Be it known that I, WILLIAM H. COURTENAY, a citizen of the United States, residing at Philadelphia, in the county of Philadelphia and State of Pennsylvania, have invented certain new and useful Improvements in Auto-Treads, of which the following is a specification.

My invention relates to improvements in treads for automobile and auto truck treads.

The objects of my invention are to provide a non-puncturable tread; one having a greater surface contact with the roadway thereby giving more power to the driving wheels and one that adds greater resiliency to the shoe—owing to the fact that it takes advantage of the entire diameter of the shoe. Also a tread that prevents skidding sidewise due to the metal running at right angles to the direction of skidding and other objects as will hereinafter appear.

I attain these objects by means of the mechanism illustrated in the accompanying drawings in which—

Figure 1, is a plan view of the device looking down on top of the wheel;

Fig. 2, is a sector of an auto wheel showing the rim, shoe, and tread in their relative positions;

Fig. 3 is a transverse section of the device on line 3—3 of Fig. 1.

Similar letters refer to similar parts throughout the drawings.

The rim $a$ is supported by the spokes $b$ in the ordinary way and the shoe $c$ is attached to the rim and the tread $d$ is attached to the shoe $c$. The said tread $d$ consists of a series of vertical laminated links $e$ comprising a continuous tread around the entire periprehy of the shoe $c$ and are here illustrated as an integral part of the shoe but may be constructed separately and attached in any convenient manner to any kind of shoe.

Said laminated links $e$ consist of layers of metal and fiber, or leather, rubber or other suitable material, alternately, as shown at $f$. The said layers of metal and fiber, or other suitable material, or laminations comprising each separate link, are securely riveted together by means of the rivets $g$.

The series of laminated links $e$ are connected flexibly together by means of the metal pin $h$. A strip $i$ of asbestos, felt, or other suitable non-conductor of heat is provided as shown to prevent the metal of the tread from coming in direct contact with the inner tube of the tire.

Having described my invention, what I claim as new and desire to secure by Letters Patent is:—

In combination with the rim of an auto wheel having a shoe attached thereto of an auto tread attached to said shoe, comprising a series of vertical laminated links, the laminations of each separate link being riveted together, and a metal pin flexibly connecting each separate link with the other links so as to form a continuous tread around the entire periphery of said auto shoe, all substantially as shown and described.

In testimony whereof I affix my signature in presence of two witnesses.

WILLIAM H. COURTENAY.

Witnesses:
JAMES S. CLIFFORD,
R. W. ROGERS.

Copies of this patent may be obtained for five cents each, by addressing the "Commissioner of Patents, Washington, D. C."